United States Patent
Han et al.

(10) Patent No.: US 11,983,492 B2
(45) Date of Patent: May 14, 2024

(54) ADVERSARIAL MULTI-BINARY NEURAL NETWORK FOR MULTI-CLASS CLASSIFICATION

(71) Applicant: BEIJING DIDI INFINITY TECHNOLOGY AND DEVELOPMENT CO., LTD., Beijing (CN)

(72) Inventors: Kun Han, Mountain View, CA (US); Haiyang Xu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 918 days.

(21) Appl. No.: 17/014,256

(22) Filed: Sep. 8, 2020

(65) Prior Publication Data

US 2020/0401844 A1    Dec. 24, 2020

Related U.S. Application Data

(63) Continuation of application No. PCT/CN2019/087032, filed on May 15, 2019.

(51) Int. Cl.
   *G06F 40/216*    (2020.01)
   *G06F 18/211*    (2023.01)
   (Continued)

(52) U.S. Cl.
   CPC .......... *G06F 40/216* (2020.01); *G06F 18/211* (2023.01); *G06F 18/2132* (2023.01);
   (Continued)

(58) Field of Classification Search
   CPC .. G06F 40/216; G06F 18/2132; G06F 18/211; G06F 18/2431; G06N 3/044
   See application file for complete search history.

(56) References Cited

U.S. PATENT DOCUMENTS 11,568,863 B1 * 1/2023 Sarikaya ................ G10L 15/02
2007/0162924 A1    6/2007 Radhakrishnan et al.
(Continued)

FOREIGN PATENT DOCUMENTS

| CN | 105549885 A | 5/2016 |
|---|---|---|
| CN | 108701125 A | 10/2018 |
| CN | 109657473 A | 9/2020 |

OTHER PUBLICATIONS

International Search Report issued in corresponding International Application No. PCT/CN2019/087032, dated Feb. 10, 2020, 4 pages.
(Continued)

*Primary Examiner* — Beau D Spratt
(74) *Attorney, Agent, or Firm* — BAYES PLLC

(57) ABSTRACT

Embodiments of the disclosure provide a multi-class classification system. An exemplary system includes at least one processor and at least one non-transitory memory storing instructions that, when executed by the at least one processor, cause the system to perform operations. The operation includes applying a multi-class classifier to classify a set of objects into multiple classes and applying a plurality of binary classifiers to the set of objects, wherein the plurality of binary classifiers are decomposed from the multi-class classifier, each binary classifier classifying the set of the objects into a first group consisting of one or more classes selected from the multiple classes and a second group consisting of one or more remaining classes of the multiple classes. The operation also includes jointly classifying the set of objects using the multi-class classifier and the plurality of binary classifiers.

20 Claims, 3 Drawing Sheets

(51) Int. Cl.
- *G06F 18/2132* (2023.01)
- *G06F 18/2431* (2023.01)
- *G06N 3/044* (2023.01)
- *G06N 20/20* (2019.01)
- *G06N 3/045* (2023.01)

(52) U.S. Cl.
CPC ......... *G06F 18/2431* (2023.01); *G06N 3/044* (2023.01); *G06N 3/045* (2023.01); *G06N 20/20* (2019.01)

(56) References Cited

U.S. PATENT DOCUMENTS

| | | |
|---|---|---|
| 2014/0222723 A1 | 8/2014 | Narasimha et al. |
| 2017/0185581 A1 | 6/2017 | Bojja et al. |
| 2017/0243124 A1* | 8/2017 | Wang ..................... G06N 20/00 |
| 2019/0180246 A1* | 6/2019 | Ferguson ............... G06N 20/10 |
| 2019/0278990 A1* | 9/2019 | Mansour .................. G06T 7/10 |
| 2020/0167690 A1* | 5/2020 | Zhao ................. G06F 18/23213 |
| 2020/0210808 A1* | 7/2020 | Dong ..................... G06N 3/084 |
| 2020/0233956 A1* | 7/2020 | Wang .................... B60L 53/305 |
| 2021/0049424 A1* | 2/2021 | Lin ......................... H04L 43/04 |

OTHER PUBLICATIONS

Written Opinion of the International Searching Authority issued in corresponding International Application No. PCT/CN2019/087032, dated Feb. 10, 2020, 4 pages.

\* cited by examiner

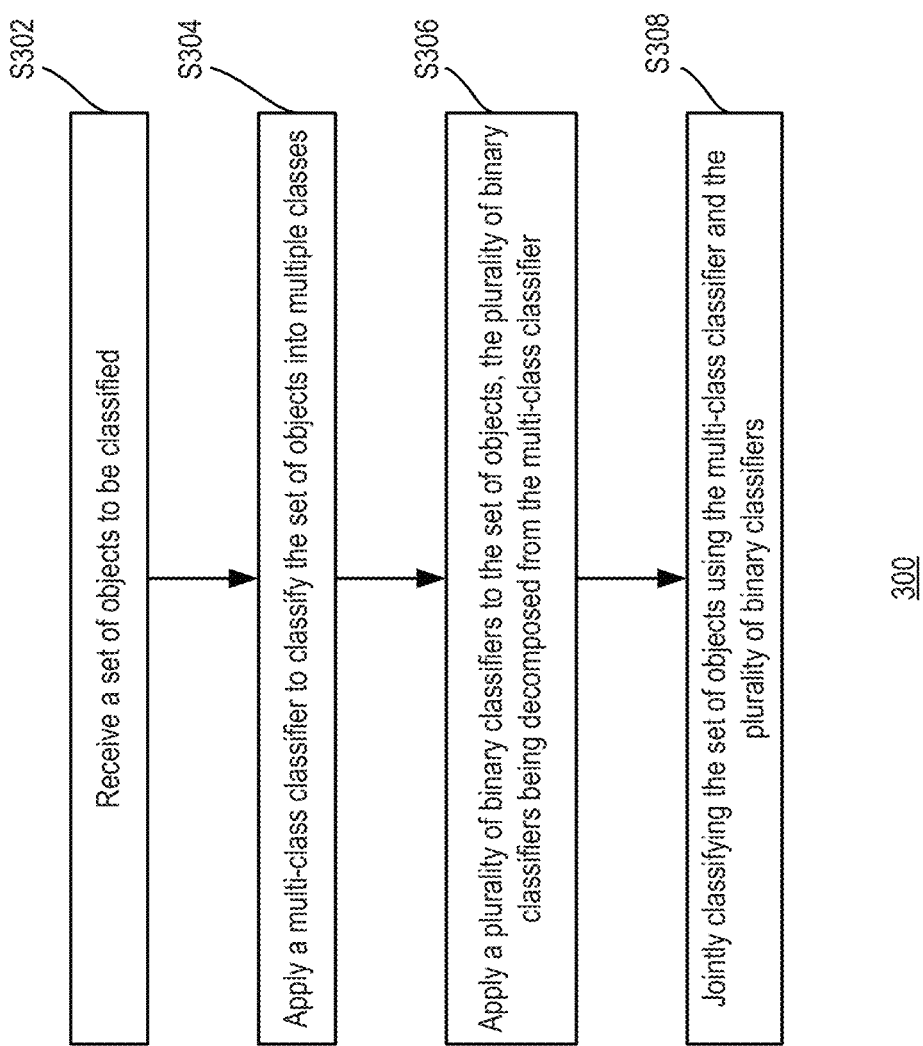

ADVERSARIAL MULTI-BINARY NEURAL NETWORK FOR MULTI-CLASS CLASSIFICATION

CROSS-REFERENCE TO RELATED APPLICATION

This application is a continuation of International Application No. PCT/CN2019/087032, filed May 15, 2019, the entire contents of which are expressly incorporated herein by reference.

TECHNICAL FIELD

The present disclosure relates to artificial intelligence (AI) systems and methods for classifying a set of objects, and more particularly to, AI systems and methods for multi-class classification using adversary multi-binary neural networks.

BACKGROUND

Text classification techniques have gained increasing popularity in many applications. For example, a transportation service platform may use a text classification system to detect safety issues based on communications between users and custom service.

Text classification can be performed using a natural language processing (NLP) method, in which labels are assigned to a given text object such as a word, sentence, or paragraph. NLP has been used in broad applications ranging from sentiment classification to topic labeling. Traditional text classification methods design a set of hand-crafted expert features, and then use appropriate machine learning classifiers to classify text objects. Recent methods mainly focus on deep learning, using models such as convolutional neural networks (CNNs) and recurrent neural networks (RNNs) to automatically learn text representations and integrating text representation learning and classification into a unified framework to accomplish more accurate classification results.

Multi-class classification classifies objects into multiple classes (e.g., assigning multiple labels), and faces additional challenges such as distinguishing features that are specific to each class and features that are shared by multiple classes. The latter tends to mislead the multi-class classifier to produce inaccurate classification results. Existing methods lack sufficient measures to account for the adverse effect associated with such shared features.

Embodiments of the disclosure address the above problem by providing improved artificial intelligence systems and methods for multi-class classification using adversary multi-binary neural networks.

SUMMARY

In one aspect, embodiments of the disclosure provide a multi-class classification system. The system includes at least one processor and at least one non-transitory memory storing instructions that, when executed by the at least one processor, cause the system to perform operations. The operations include applying a multi-class classifier to classify a set of objects into multiple classes and applying a plurality of binary classifiers to the set of objects. The plurality of binary classifiers are decomposed from the multi-class classifier, each binary classifier classifying the set of the objects into a first group consisting of one or more classes selected from the multiple classes and a second group consisting of one or more remaining classes of the multiple classes. The operations also include jointly classifying the set of objects using the multi-class classifier and the plurality of binary classifiers.

In another aspect, embodiments of the disclosure also provide a multi-class classification method. The method includes applying a multi-class classifier to classify a set of objects into multiple classes and applying a plurality of binary classifiers to the set of objects, wherein the plurality of binary classifiers are decomposed from the multi-class classifier, each binary classifier classifying the set of the objects into a first group consisting of one or more classes selected from the multiple classes and a second group consisting of one or more remaining classes of the multiple classes. The method further includes jointly classifying the set of objects using the multi-class classifier and the plurality of binary classifiers.

In a further aspect, embodiments of the disclosure further provide a non-transitory computer-readable medium having instructions stored thereon that, when executed by at least one processor, causes the processor to perform a method for classifying a set of objects. The method includes applying a multi-class classifier to classify the set of objects into multiple classes and applying a plurality of binary classifiers to the set of objects. The plurality of binary classifiers are decomposed from the multi-class classifier, each binary classifier classifying the set of the objects into a first group consisting of one or more classes selected from the multiple classes and a second group consisting of one or more remaining classes of the multiple classes. The method further includes jointly classifying the set of objects using the multi-class classifier and the plurality of binary classifiers.

It is to be understood that both the foregoing general description and the following detailed description are exemplary and explanatory only and are not restrictive of the invention, as claimed.

BRIEF DESCRIPTION OF THE DRAWINGS

FIG. 3 illustrates a flowchart of an exemplary method for classifying a set of objects, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
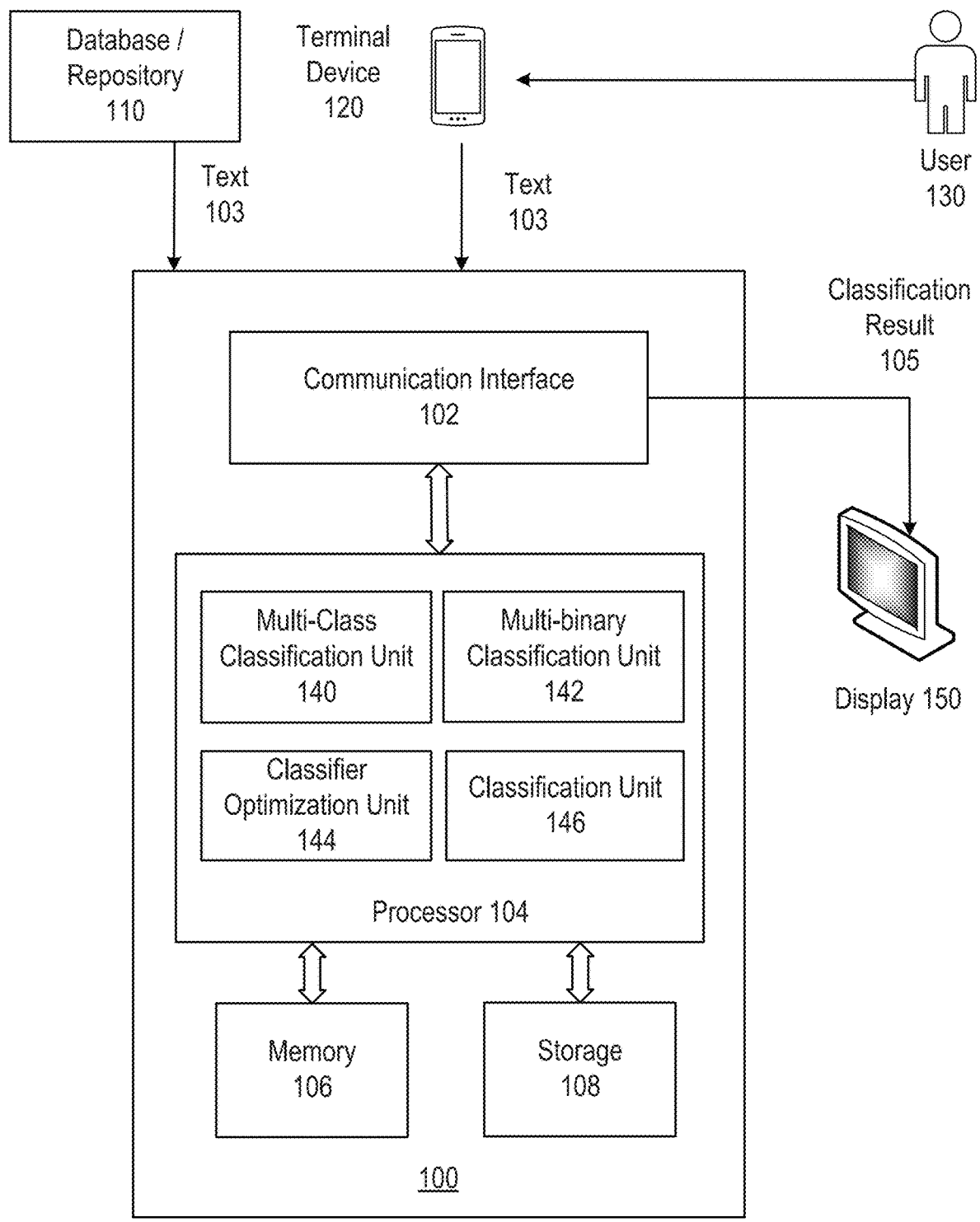
FIG. 1 illustrates a schematic diagram of an exemplary system for classifying a set of objects, according to embodiments of the disclosure.

FIG. 1 illustrates a block diagram of an exemplary system 100 for classifying a set of objects, according to embodiments of the disclosure. In some embodiments, the set of objects may be textual objects, such as sentences, words, etc. For example, system 100 may be used to classify comments and/or reviews (e.g., movie reviews, online forum communications, recorded customer service dialogues). Consistent with the present disclosure, system 100 may receive text objects 103 from a database or repository 110 (e.g., a database storing recorded customer service dialogues, a text repository containing online chat records, etc.). In some embodiments, text objects 103 may also be collected from terminal devices, such as a terminal device 120. For example, terminal device 120 may be a mobile phone, a desktop computer, a laptop, a PDA, a robot, a kiosk, etc. Terminal device 120 may include a user interaction interface configured to receive text objects 103 provided by a user 130. In some embodiments, terminal device 120 may include a keyboard, physical or virtual, for user 130 to type in text objects 103. Terminal device 120 may additionally or alternatively include a touch screen for user 130 to handwrite text objects 103. Accordingly, terminal device 120 may record user comments and/or reviews as text objects 103. If the input is handwriting, terminal device 120 may automatically recognize the handwriting and convert it to text information. In some embodiments, terminal device 120 may include a microphone, for recording audio input provided by user 130. Terminal device 120 may automatically transcribe the recorded audio data into text. In some embodiments, system 100 may receive text objects 103 in the original format as captured by terminal device 120, and conversion from the original format to text format, such as handwriting recognition and/or audio transcription, may be performed by system 100.

In some embodiments, as shown in FIG. 1, system 100 may include a communication interface 102, at least one processor, such as processor 104, at least one memory, such as memory 106, and at least one storage, such as storage 108. In some embodiments, system 100 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of system 100 may be located in a cloud computing environment or may be alternatively in a single location (such as inside a mobile device) or distributed locations. Components of system 100 may be in an integrated device or distributed at different locations but communicate with each other through a network (not shown). Consistent with the president disclosure, system 100 may be configured to automatically classify text objects 103 into multiple classes using an adversary multi-binary neural network that performs classification jointly using a multi-class classifier and multiple binary classifiers.

Communication interface 102 may send data to and receive data from components such as terminal device 120 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 102 may include an integrated services digital network (ISDN) card, cable modem, satellite modem, or a modem to provide a data communication connection. As another example, communication interface 102 may include a local area network (LAN) card to provide a data communication connection to a compatible LAN. Wireless links can also be implemented by communication interface 102. In such an implementation, communication interface 102 can send and receive electrical, electromagnetic or optical signals that carry digital data streams representing various types of information.

Consistent with some embodiments, communication interface 102 may receive data such as text objects 103 from database 110 and/or terminal device 120. Text objects 103 may be received in text format or in other formats as acquired by terminal device 120, such as audio or handwriting formats. Text objects 103 may include one sentence or multiple sentences that describe a theme (e.g., a movie review, a product comment, a question/answer, or communications associated with a service) and/or user experience. For example, user 130 may describe her feeling as "I am having a great time watching this movie, a must see!" Communication interface 102 may further provide the received data to memory 106 and/or storage 108 for storage or to processor 104 for processing.

Processor 104 may include any appropriate type of general-purpose or special-purpose microprocessor, digital signal processor, or microcontroller. Processor 104 may be configured as a separate processor module dedicated to classifying text objects 103. Alternatively, processor 104 may be configured as a shared processor module for performing other functions unrelated to classification.

As shown in FIG. 1, processor 104 may include multiple modules, such as a multi-class classification unit 140, a multi-binary classification unit 142, a classifier optimization unit 144, a classification unit 146, and the like. These modules (and any corresponding sub-modules or sub-units) can be hardware units (e.g., portions of an integrated circuit) of processor 104 designed for use with other components or software units implemented by processor 104 through executing at least part of a program. The program may be stored on a computer-readable medium, and when executed by processor 104, it may perform one or more functions. Although FIG. 1 shows units 140-146 all within one processor 104, it is contemplated that these units may be distributed among multiple processors located closely or remotely with each other.

Figure 2:
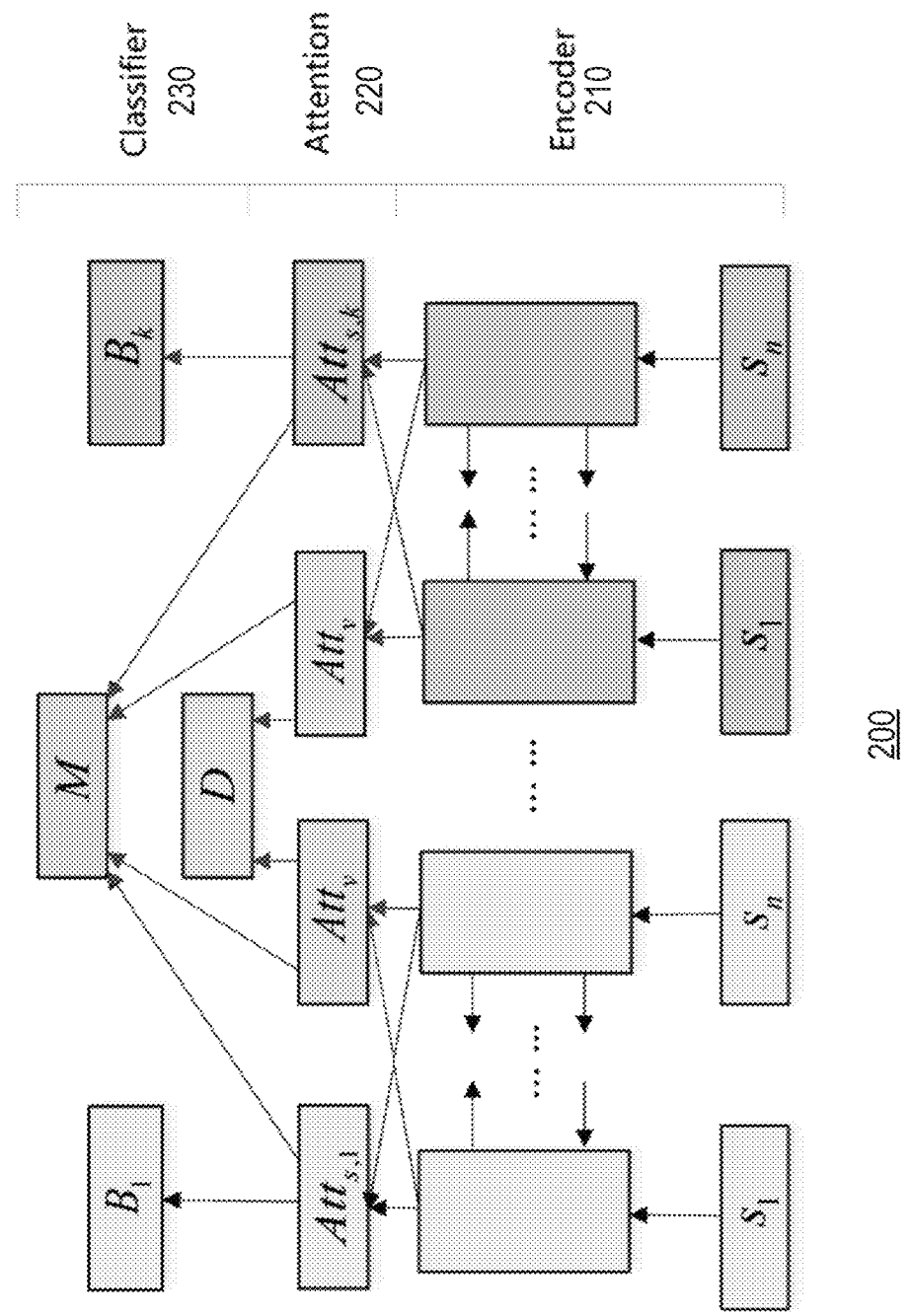
FIG. 2 illustrates a schematic diagram of an exemplary implementation of the system shown in FIG. 1, according to embodiments of the disclosure.

In some embodiments, units 140-146 execute a computer program to apply an adversary multi-binary neural network to automatically classify text objects 103. For example, FIG. 2 illustrates a schematic diagram of an adversary multi-binary neural network 200 for classifying a set of objects, such as text objects 103, according to embodiments of the disclosure. In some embodiments, adversary multi-binary neural network 200 may include several layers, such as an encoder layer 210, an attention layer 220 and a classifier layer 230. FIG. 2 will be described together with units 140-146.

In some embodiments, when text objects 103 contains multiple units, such as words, sentences, etc., text objects 103 may be divided according to these units, such as different sentences. For example, as shown in FIG. 2, a text (e.g., text objects 103) may be divided into sentences $S_1$, $S_2 \ldots S_n$, if the text has n sentences. $S_i$ is the sentence vector of the ith sentence. In some embodiments, if the given text is a sentence that includes multiple words, the sentence may be divided into $S_1, S_2 \ldots S_n$ words if the text has n words. In those embodiments, $S_i$ would be the word vector of the ith word. Multi-class classification unit 140 may apply a multi-class classifier for classifying text objects 103 into multiple classes. For example, multi-class classification unit 140 may represent the multiple classes with a label vector $y=\{y_1, jy_2 \ldots y_m\}$, where m is the number of classes. For example, $y_1$ may be a label representing a first rating of a movie (e.g., one star), $y_2$ may be a label representing a second rating of a movie (e.g., two stars), etc.

In some embodiments, multiple binary classifiers may be used to enhance the classification accuracy of the classification result. For example, multi-binary classification unit 142 may include multiple binary classifiers that are decomposed from the multi-class classifier provided by multi-class classification unit 140. In this way, the multi-class classification task may be divided into k binary subtasks. For example, a one v. rest (OVR) strategy may be used to decompose the multi-class classifier. In the jth binary classifier, the multiple classes $y=\{y_1, y_2 \ldots y_m\}$ may be divided into two (binary) classes by multiplying a vector $y^j=\{y_1^j, y_2^j \ldots y_m^j\}$, $y_i^j=1$ only if $y_i$ is included in the subtask j split, and $y_i^j=0$ if otherwise. For instance, an exemplary split may be represented as class 1: $\{y_1, y_2 \ldots y_p\}$ and class 2: $\{y_{p+1}, y_{p+2} \ldots y_m\}$. In another example, class 1 may be $\{y_1\}$ and class 2 may be $\{y_2 \ldots y_m\}$.

In some embodiments, multi-binary classification unit 142 may include encoders to learn specific contextual information from the input text. As shown in FIG. 2, encoder layer 210 may be configured to learn the specific contextual information from $S_1, S_2 \ldots S_n$. For example, multi-binary classification unit 142 may determine word/sentence representations by assigning a separate bidirectional long short memory (BiLSTM) to each binary task and learn the specific contextual information of each binary task. In some embodiments, a bi-directional learning model may be used to generate the word/sentence representations. Bi-directional LSTM model is a type of recurrent neural network (RNN) and may process data sequentially and keep its hidden state through time. Unlike word/sentence vectors that contain meanings and features of the individual words/sentences, word/sentence representations additionally provide context information of the words/sentences, i.e., information of the entire sentence the words are in or information of the entire passage the sentences are in.

In some embodiments, the BiLSTM model may include two sets of LSTM cells, designed to let data flow in two different directions. For example, one set of LSTM cells process word/sentences vectors in the order of v1, v2, v3, v4, v5, and v6 so that data flows in the "forward" direction. Another set of LSTM cells process these word/sentence vectors in the order of v6, v5, v4, v3, v2, and v1 so that data flows in the "backward" direction. Within each set, the multiple LSTM cells are connected sequentially with each other. In some embodiments, the two sets of LSTM cells are internally connected to provide additional data flow. By using a bi-directional model, multi-binary classification unit 142 may obtain word/sentence representations that contain rich "bi-directional" (forward and backward) context information of the words/sentences.

In some embodiments, multi-binary classification unit 142 may further use k private attention $Att_{s,j}$ to capture class-specific word/sentence representation $s^j$ and may use a shared attention layer $Att_v$, to obtain class-agnostic word/sentence representation $v^j$ for all subtasks. Class-agnostic representations may contain feature(s) that are shared by all classes, and therefore should not be relied upon to in the multi-class classification process. These shared feature(s) may mislead multi-class classification unit 140 to generate inaccurate classification results. By capturing and taking into account the class-agnostic information, the multi-class classification process can be reinforced.

As shown in FIG. 2, attention layer 220 may include k private attention $Att_{s,j}$ and a shared attention $Att_v$.

In some embodiments, the class-agnostic representation $v^j$ and the class-specific representation $s^j$ may be calculated as:

$$h_i^j = BiLSTM_k(s_i), i \in \{1,n\}, j \in [1,k] \quad (1)$$

$$s^j = Att_{s,j}(h_i^j), i \in \{1,n\}, j \in \{1,k\} \quad (2)$$

$$v^j = Att_v(h_i^j), i \in \{1,n\}, j \in \{1,k\} \quad (3)$$

where $h_i^j$ is the subtask $S_i$ is assigned into.

Classifier optimization unit 144 may optimize the multi-class classifier (e.g., implemented by unit 140) using classification results of the multiple binary classifiers (e.g., implemented by unit 142). In some embodiments, an adversarial training may be applied to learn the class-agnostic representation $v^j$. In some embodiments, the learned class-agnostic representations together with the class-specific representations generated from each binary classifier may be fed into the multi-class classifier to optimize the multi-class classification process. In some embodiments, classifier optimization unit 144 may define a task discriminator D as shown in FIG. 2. Task discriminator D may be used to get the type label of the subtask by calculating a shared representation and adversarial loss for multi-class classification. This may prevent the class-specific representation from creeping into a shared space created by shared representations. In some embodiments, task discriminator D and the adversarial loss $L_{adv}$ may be calculated as:

$$D(s^j) = \text{softmax}(W_d s^j + b_d), j \in \{1, k\} \quad (4)$$

$$L_{adv} = \min_{\theta_s}\left(\lambda \max_{\theta_D}\left(\sum_{j=1}^{k}\sum_{i=1}^{n} d_i^j \log(D(s^j))\right)\right) \quad (5)$$

where $W_{ds}^j$ and $b_d$ are parameters that may be trained during the model training and $d_i^j$ is the parameter denotes the task type label. In some embodiments, subtask discriminator D may be used to correct the classification on the task type as the share attention layer may generate representations that is misleading to the multi-class classification.

In some embodiments, classifier optimization unit 144 may concatenate features from class-agnostic representation $v^j$ and class-specific representation $s^j$. For example, classifier optimization unit 144 may apply a max-pool method to the class-agnostic representation $v^j$ and class-specific representation $s^j$ while the classification features of main task lit are concatenated from private feature of each subtask and shared feature of all subtasks:

$$p^j = \text{softmax}(W_j h^j + b_j), j \in \{1,k\} \quad (6)$$

$$p^t = \text{softmax}(W_t h^t + b_t) \quad (7)$$

Classifier optimization unit 144 may also jointly optimize the multi-class classifier and the multiple binary classifiers based on minimizing a final loss L. In some embodiments, a negative log likelihood of the correct labels may be used for representing classification loss $L_{cls}$. For example, the multi-binary classification loss $L_{cls}^j$ and the multi-class classification loss $L_{cls}^t$ may be calculated as:

$$L_{cls}^j = -\sum_{d=1}(y_d^j \log p_d^j + (1 - y_d^j)\log(1 - p_d^j)) \quad (8)$$

$$L_{cls}^t = -\sum_{d=1}^{M}\sum_{z=1}^{m} y_d^z \log p_d^z \quad (9)$$

where M (shown in FIG. 2) is the size of dataset. In some embodiments, the final loss L may be calculated as:

$$L = -\sum_{j=1}^{k} a_j L_{cls}^j + \beta L_{cls}^t \quad (10)$$

where $\alpha$ and $\beta$ are hyper-parameters.

In some embodiments, where an adversarial training is adopted, the final loss L may be calculated as:

$$L = -\sum_{j=1}^{k} \alpha_j L_{cls}^j + \beta L_{cls}^t + \gamma L_{adv} \quad (11)$$

where γ is also a hyper-parameter.

The multi-class classifier (e.g., implemented by unit 140) and multiple binary classifiers (e.g., implemented by unit 142) may be jointly trained using a training dataset. For example, the joint training may be performed to minimize the total loss L shown in equation (10) (e.g., if adversarial training is not adopted) or (11) (e.g., if adversarial training is adopted).

Classification unit 146 may use the trained model to classify data (e.g., text objects 103) received by system 100. For example, classification unit 146 may classify a piece of comment (e.g., a movie review) based on the jointly trained multi-class classifier and the multiple binary classifiers.

Although the embodiments described above train model 200 using the adversarial training as shown in FIG. 2, in some embodiments, model 200 may also be implemented without the adversarial training. That is, class-agnostic representation $v^j$ and class-specific representation $s^j$ may be optimized without generating a task discriminator D. For example, in embodiments where no adversarial training is adopted, the multi-class classifier and the multiple binary classifiers may be optimized based only on minimizing the multi-binary classification loss $L_{cls}^j$ and the multi-class classification loss $L_{cls}^t$ as illustrated in equation (10).

Memory 106 and storage 108 may include any appropriate type of mass storage provided to store any type of information that processor 104 may need to operate. Memory 106 and storage 108 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 106 and/or storage 108 may be configured to store one or more computer programs that may be executed by processor 104 to perform functions disclosed herein. For example, memory 106 and/or storage 108 may be configured to store program(s) that may be executed by processor 104 to generate classification result 105 using adversary multi-binary neural network learning model 200.

Memory 106 and/or storage 108 may be further configured to store information and data used by processor 104. For instance, memory 106 and/or storage 108 may be configured to store the various types of data (e.g., entities associated with known classification). For example, entities may include "the movie is good," "the movie is great," "it is worth watching," "that is awesome," "very impressive," etc.

In some embodiments, memory 106 and/or storage 108 may also store intermediate data such as the sentence/word vectors, sentence/word representations, attentions, etc. Memory 106 and/or storage 108 may additionally store various learning models including their model parameters, such as word embedding models, BiLSTM models, span representation models, and softmax models that may be used for text classification. The various types of data may be stored permanently, removed periodically, or disregarded immediately after the data is processed.

Classification result 105 may be stored in memory 106/ storage 108, and/or may be provided to user 130 through a display 150. Display 150 may include a display such as a Liquid Crystal Display (LCD), a Light Emitting Diode Display (LED), a plasma display, or any other type of display, and provide a Graphical User Interface (GUI) presented on the display for user input and data depiction. The display may include a number of different types of materials, such as plastic or glass, and may be touch-sensitive to receive inputs from the user. For example, the display may include a touch-sensitive material that is substantially rigid, such as Gorilla Glass™, or substantially pliable, such as Willow Glass™. In some embodiments, display 150 may be part of system 100.

FIG. 3 illustrates a flowchart of an exemplary method 300 for classifying a set of objects using a multi-binary neural network, according to embodiments of the disclosure. It is to be appreciated that method 300 may be implemented by system 100 and particularly processor 104 or a separate processor not shown in FIG. 1. Method 300 may include steps S302-S308 as described below. It is to be appreciated that some of the steps may be optional to perform the disclosure provided herein. Further, some of the steps may be performed simultaneously, or in a different order than shown in FIG. 3.

In step S302, system 100 may receive a set of objects, e.g., text objects 103. Text objects 103 may be received from a database or repository. In some embodiments, text objects 103 may also be provided as texts or in its original format as acquired by terminal device 120, such as an audio or in handwriting. If received as an audio, terminal device 120 may be transcribed into texts. If received in handwriting, text objects 103 may be automatically recognized and convert into texts. Text objects 103 may include one sentence or multiple sentences that describe a theme (e.g., a movie review, a product comment, a question/answer, or communications associated with a service) and/or user experience. For example, user 130 may describe her feeling about a movie as "I am having a great time watching this fun movie. Also, the main actor is awesome. And I strongly recommend everyone to go to a theater to watch it."

In some embodiments, when text objects 103 contains multiple units, such as words, sentences, etc., text objects 103 may be divided according to these units, such as different sentences. For example, the above exemplary description may be divided into three sentences: "I am having a great time watching this fun movie." "Also, the main actor is awesome." and "And I strongly recommend everyone to go to a theater to watch it." In some embodiments, if the given text is a sentence that includes multiple words, the sentence may be divided into $S_1, S_2 \ldots S_n$ words if the text has n words.

In step S304, system 100 may apply multi-class classifiers for classifying text 130 into multiple classes. In some embodiments, system 100 may represent the multiple classes with a label vector $y=\{y_1, y_2 \ldots y_m\}$, where m is the number of classes. For example, $y_1$ may be a label representing a first rating of a movie (e.g., one star), $y_2$ may be a label representing a second rating of a movie (e.g., two stars), etc.

In step S306, system 100 may apply a plurality of binary classifiers decomposed from the multi-class classifier $y=\{y_1, y_2 \ldots y_m\}$ to enhance the classification accuracy of the classification result. For example, multi-binary classification unit 142 may include multiple binary classifiers that are decomposed from the multi-class classifier provided by multi-class classification unit 140. In this way, the multi-class classification task may be divided into k binary subtasks. For example, a one v. rest (OVR) strategy may be used to decompose the multi-class classifier. In the jth binary classifier, the multiple classes y={y$_1$, y$_2$ . . . y$_m$} may be divided into two (binary) classes by multiplying a vector y$^j$={y$_1^j$, y$_2^j$ . . . y$_m^j$}, y$_i^j$=1 only if y$_i$ is included in the subtask j split, and y$_i^j$=0 if otherwise. For instance, an exemplary split may be represented as class 1: {y$_1$, y$_2$ . . . y$_p$} and class 2: {y$_{p+1}$, y$_{p+2}$ y$_m$}. In another example, class 1 may be {y$_1$} and class 2 may be {y$_2$ . . . y$_m$}.

In some embodiments, system may also include encoders to learn specific contextual information from the input text. Encoder layer 210 may be configured to learn the specific contextual information from S$_1$, S$_2$ . . . S$_n$. For example, system 100 may assigned a separate bidirectional long short memory (BiLSTM) to each binary task and learn the specific contextual information of each binary task.

In some embodiments, multi-binary system may further use k private attention Att$_{s,j}$ to capture class-specific sentence representation s$^j$ and may use a shared attention layer Att$_v$, to get the class-agnostic representation v$^j$ for all subtasks. In some embodiments, attention layer 220 may include k private attention Att$_{s,j}$ and a shared attention Att$_v$. For example, the class-agnostic representation v$^j$ and the class specific sentence representation s$^j$ may be calculated as:

$$h_i^j = \text{BiLSTM}_k(s_i), i \in \{1,n\}, j \in [1,k] \quad (1)$$

$$s^j = Att_{s,j}(h_i^j), i \in \{1,n\}, j \in \{1,k\} \quad (2)$$

$$v^j = Att_v(h_i^j), i \in \{1,n\}, j \in \{1,k\} \quad (3)$$

where h$_i^j$ is the subtask sentence S$_i$ is classified into.

In step S308, system 100 may jointly classifying the set of objects using the multi-class classifier and the plurality of binary classifiers. In some embodiments, system 100 may jointly training the multi-class classifier and the plurality of binary classifiers, and system 100 may optimize the multi-class classifier using classification results of the multiple binary classifiers. In some embodiments, an adversarial training may be applied to learn the class-agnostic representation v$^j$. For example, the learned class-agnostic representations together with the class-specific representations generated from binary classifier may be fed into the multi-class classifier to optimize the multi-class classification process. In some embodiments, system 100 may define a task discriminator D to get the type label of subtask by calculating a shared representation and an adversarial loss for the multi-class classification. This may prevent the class-specific representation from creeping into a shared space created by shared representations. In some embodiments, task discriminator D and the adversarial loss L$_{adv}$ may be calculated as:

$$D(s^j) = \text{softmax}(W_d s^j + b_d), j \in \{1, k\} \quad (4)$$

$$L_{adv} = \min_{\theta_s}\left(\lambda \max_{\theta_D}\left(\sum_{j=1}^{k}\sum_{i=1}^{n} d_i^j \log(D(s^j))\right)\right) \quad (5)$$

where W$_d$s$^j$ and b$_d$ are parameters that may be trained during the model training and d$_i^j$ the parameter denotes the task type label. In some embodiments, the subtask discriminator D may be used to correct the classification on the task type as the share attention layer may generate representations that is misleading to the multi-class classification.

In some embodiments, system 100 may concatenate features from class-agnostic representation v$^j$ and class-specific sentence representation s$^j$. For example, system 100 may apply a max-pool method to the class-agnostic representation v$^j$ and class-specific sentence representation s$^j$ while the classification features of main task h' are concatenated from private feature of each subtask and shared feature of all subtask:

$$p^j = \text{softmax}(W_j h^j + b_j), j \in \{1,k\} \quad (6)$$

$$p^t = \text{softmax}(W_t h^t + b_t) \quad (7)$$

In some embodiments, system 100 may further jointly optimize the multi-class classifiers and the multiple binary classifiers based on minimizing a final loss L. For example, a negative log likelihood of the correct labels may be used for representing classification loss L$_{cls}$. The multi-binary classification loss L$_{cls}^j$ and the multi-class classification loss L$_{cls}^t$ may be calculated as:

$$L_{cls}^j = -\sum_{d=1}(y_d^j \log p_d^j + (1 - y_d^j)\log(1 - p_d^j)) \quad (8)$$

$$L_{cls}^t = -\sum_{d=1}^{M}\sum_{z=1}^{m} y_d^Z \log p_d^Z \quad (9)$$

where M is the size of dataset. In some embodiments, the final loss L may be calculated as:

$$L = -\sum_{j=1}^{k} \alpha_j L_{cls}^j + \beta L_{cls}^t \quad (10)$$

where α and β are hyper-parameters.

In some embodiments, where an adversarial training is adopted, the final loss L may be calculated as:

$$L = -\sum_{j=1}^{k} \alpha_j L_{cls}^j + \beta L_{cls}^t + \gamma L_{adv} \quad (11)$$

where γ is also a hyper-parameter.

The multi-class classifier and multiple binary classifiers may be jointly trained using a training dataset. For example, the joint training may be performed to minimize the total loss L shown in equation (10) (e.g., if adversarial training is not adopted) or (11) (e.g., if adversarial training is adopted).

System 100 may also use the trained model to classify data (e.g., text objects 103) received by system 100. For example, classification unit 146 may classify a piece of comment (e.g., a movie review) based on the jointly trained multi-class classifier and the multiple binary classifiers.

As more abundant features representation such as the shared representations shared among all binary classifiers are taken into account, the system and/or method disclosed herein can improve the classification accuracy.

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A multi-class classification system, comprising:
   at least one processor; and
   at least one non-transitory memory storing instructions that, when executed by the at least one processor, cause the system to perform operations comprising:
      training a multi-class classifier based on calculating a shared representation and an adversarial loss;
      applying the multi-class classifier to classify a set of objects into multiple classes, wherein the set of objects comprise textual objects including a word or a sentence;
      applying a plurality of binary classifiers to the set of objects, wherein the plurality of binary classifiers are decomposed from the multi-class classifier, each binary classifier classifying the set of the objects into a first group consisting of one or more classes selected from the multiple classes and a second group consisting of one or more remaining classes of the multiple classes; and
      jointly classifying the set of objects using the multi-class classifier and the plurality of binary classifiers.

2. The system of claim 1, wherein the operations comprise:
   jointly training the multi-class classifier and the plurality of binary classifiers by minimizing a joint loss comprising a multi-class classification loss corresponding to the multi-class classifier and one or more binary classification losses corresponding to one or more binary classifiers selected from the plurality of binary classifiers.

3. The system of claim 1, wherein the operations comprise:
   receiving, by an encoder corresponding to at least one binary classifier, the set of objects; and
   generating, by the encoder, contextual information from the set of the objects.

4. The system of claim 3, wherein the encoder comprises a bidirectional long short memory (BiLSTM).

5. The system of claim 3, wherein the operations further comprise:
   determining, by a private attention layer corresponding to the at least one binary classifier, class-specific information based on the contextual information; and
   determining, by a shared attention layer, class-agnostic information based on the contextual information.

6. The system of claim 5, wherein the class-agnostic information comprises a shared feature shared by multiple classes.

7. The system of claim 5, wherein the operations comprise:
   refining, by a discriminator, the class-agnostic information by minimizing the adversarial loss.

8. The system of claim 7, wherein the operations comprise:
   jointly training the multi-class classifier and the plurality of binary classifiers by minimizing a joint loss comprising:
      a multi-class classification loss corresponding to the multi-class classifier;
      one or more binary classification losses corresponding to one or more binary classifiers selected from the plurality of binary classifiers; and
      the adversarial loss.

9. The system of claim 5, wherein the operations comprise:
   generating classification features of the at least one binary classifier by concatenating the class-specific information and the class-agnostic information.

10. The system of claim 5, wherein the operations comprise:
    generating classification features of the multi-class classifier by concatenating class-specific information corresponding to multiple binary classifiers and the class-agnostic information.

11. A multi-class classification method, comprising:
    training a multi-class classifier based on calculating a shared representation and an adversarial loss;
    applying the multi-class classifier to classify a set of objects into multiple classes, wherein the set of objects comprise textual objects including a word or a sentence;
    applying a plurality of binary classifiers to the set of objects, wherein the plurality of binary classifiers are decomposed from the multi-class classifier, each binary classifier classifying the set of the objects into a first group consisting of one or more classes selected from the multiple classes and a second group consisting of one or more remaining classes of the multiple classes; and
    jointly classifying the set of objects using the multi-class classifier and the plurality of binary classifiers.

12. The method of claim 11, comprising:
    jointly training the multi-class classifier and the plurality of binary classifiers by minimizing a joint loss comprising a multi-class classification loss corresponding to the multi-class classifier and one or more binary classification losses corresponding to one or more binary classifiers selected from the plurality of binary classifiers.

13. The method of claim 11, comprising:
    receiving, by an encoder corresponding to at least one binary classifier, the set of objects; and
    generating, by the encoder, contextual information from the set of the objects.

14. The method of claim 13, further comprising:
    determining, by a private attention layer corresponding to the at least one binary classifier, class-specific information based on the contextual information; and
    determining, by a shared attention layer, class-agnostic information based on the contextual information.

15. The method of claim 14, wherein the class-agnostic information comprises a shared feature shared by multiple classes.

16. The method of claim 14, further comprising:
    refining, by a discriminator, the class-agnostic information by minimizing the adversarial loss.

17. The method of claim 16, further comprising:
jointly training the multi-class classifier and the plurality of binary classifiers by minimizing a joint loss comprising:
- a multi-class classification loss corresponding to the multi-class classifier;
- one or more binary classification losses corresponding to one or more binary classifiers selected from the plurality of binary classifiers; and
- the adversarial loss.

18. The method of claim 14, further comprising:
generating classification features of the at least one binary classifier by concatenating the class-specific information and the class-agnostic information.

19. The method of claim 14, further comprising:
generating classification features of the multi-class classifier by concatenating class-specific information corresponding to multiple binary classifiers and the class-agnostic information.

20. A non-transitory computer-readable medium having instructions stored thereon that, when executed by at least one processor, causes the processor to perform a method for classifying a set of objects, the method comprising:

training a multi-class classifier based on calculating a shared representation and an adversarial loss;

applying the multi-class classifier to classify the set of objects into multiple classes, wherein the set of objects comprise textual objects including a word or a sentence;

applying a plurality of binary classifiers to the set of objects, wherein the plurality of binary classifiers are decomposed from the multi-class classifier, each binary classifier classifying the set of the objects into a first group consisting of one or more classes selected from the multiple classes and a second group consisting of one or more remaining classes of the multiple classes; and jointly classifying the set of objects using the multi-class classifier and the plurality of binary classifiers.

* * * * *